Feb. 26, 1935.    R. E. RUNDELL    1,992,773
LEAF FEED FOR STEMMING MACHINES
Filed Oct. 28, 1933    3 Sheets-Sheet 1
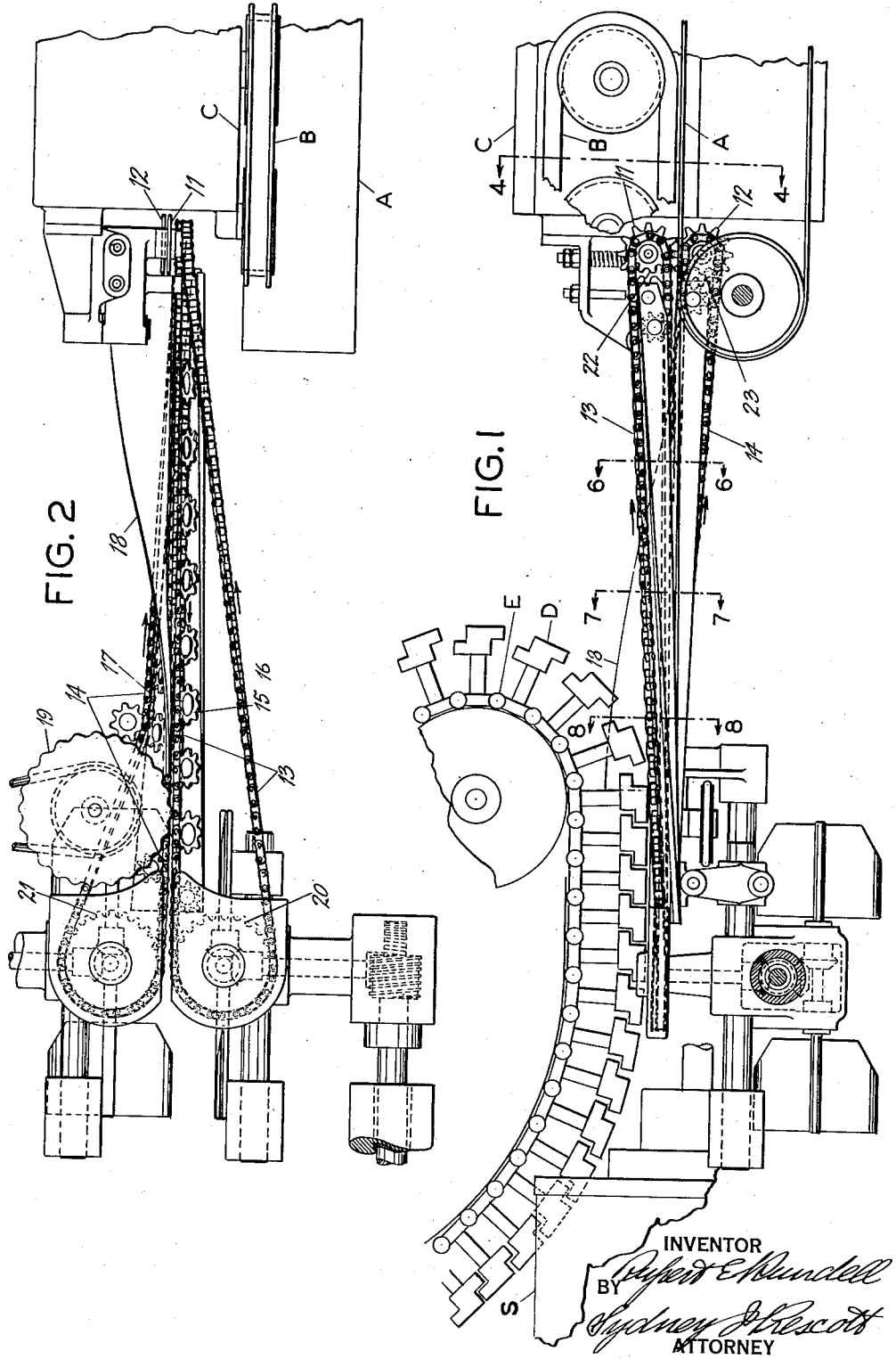

Feb. 26, 1935. R. E. RUNDELL 1,992,773
LEAF FEED FOR STEMMING MACHINES
Filed Oct. 28, 1933 3 Sheets-Sheet 2
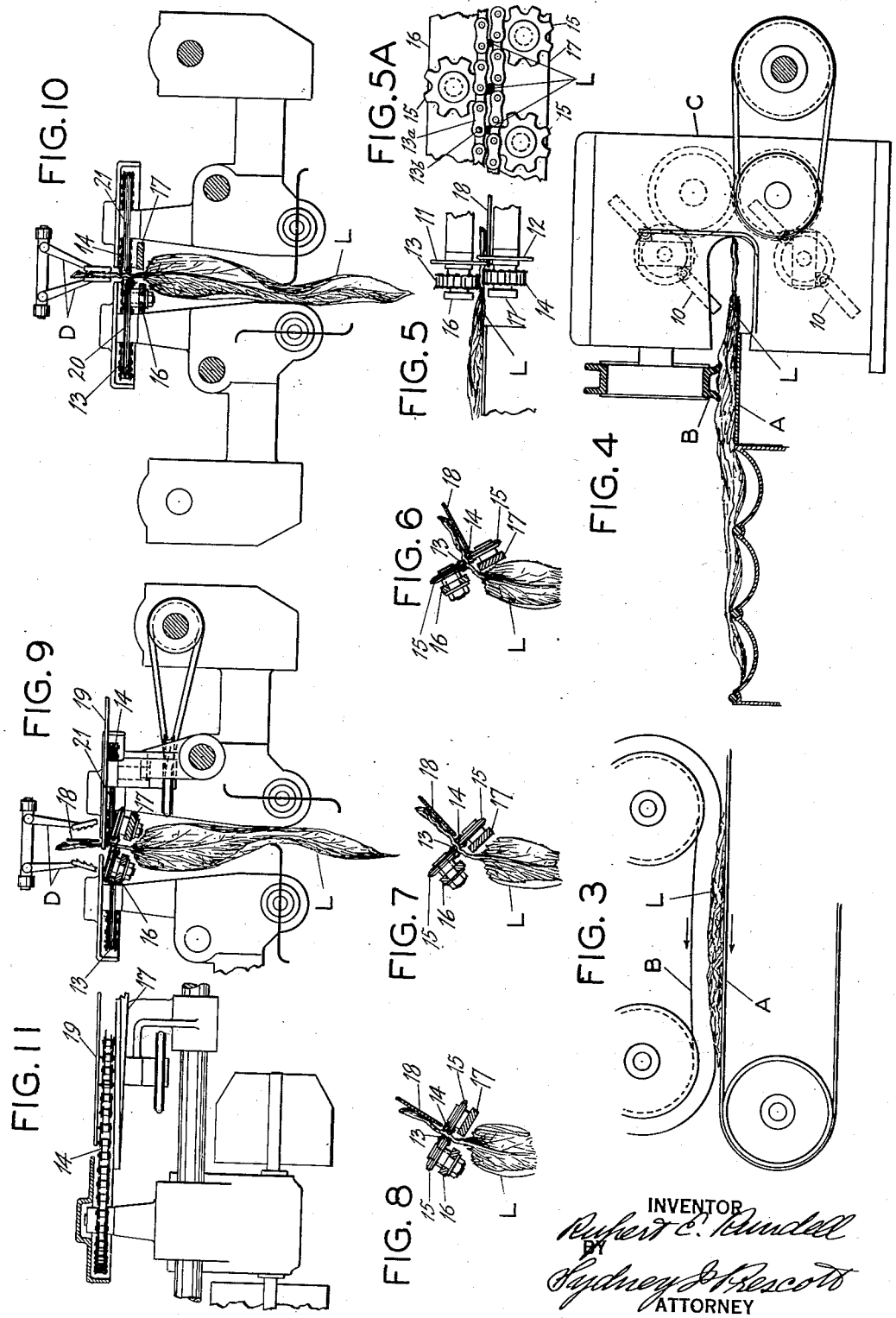

Feb. 26, 1935.   R. E. RUNDELL   1,992,773
LEAF FEED FOR STEMMING MACHINES
Filed Oct. 28, 1933   3 Sheets-Sheet 3
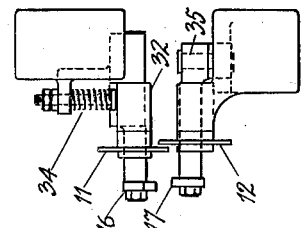
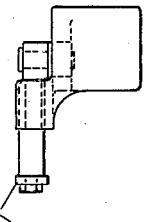
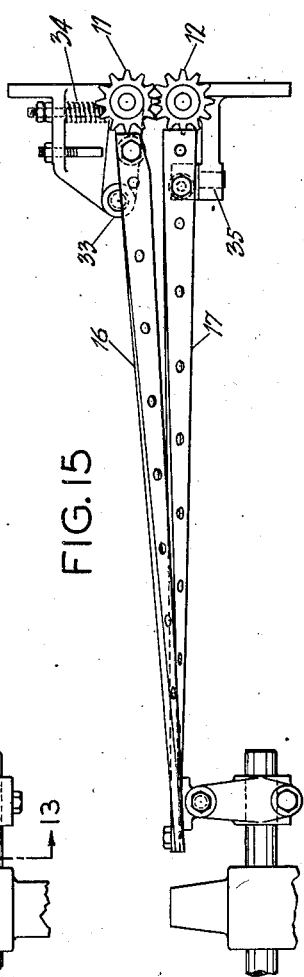
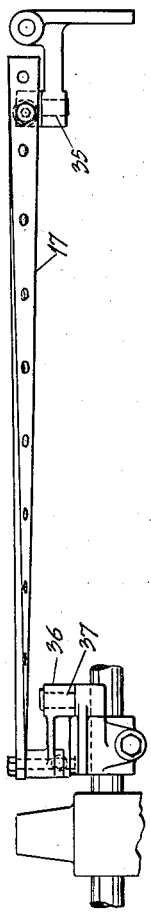
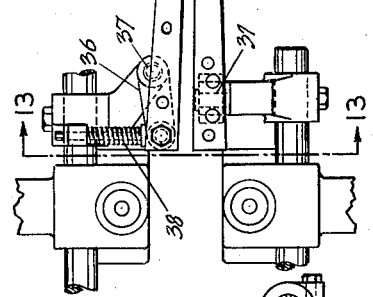
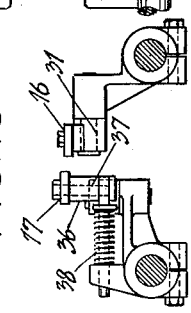
INVENTOR
Rupert E. Rundell
BY
Sydney Prescott
ATTORNEY Patented Feb. 26, 1935

1,992,773

UNITED STATES PATENT OFFICE 1,992,773

LEAF FEED FOR STEMMING MACHINES

Rupert E. Rundell, Rockville Centre, N. Y., assignor, by mesne assignments, to American Machine & Foundry Company, a corporation of New Jersey Application October 28, 1933, Serial No. 695,695

8 Claims. (Cl. 131—57)

This invention relates to leaf feeds for tobacco stemming machines and consists in certain improvements in machines of the type disclosed in my co-pending application for U. S. Letters Patent, Serial #638,822, entitled "Tobacco stemming machine" and filed October 20, 1932.

An important object of the invention is to prevent dropping of leaves in the leaf feeding mechanism which carries the leaves from the feed table or threshing mechanism to the devices which carry the leaves through the stemmer proper.

Another principal object of the invention is to provide for more certain and uniform spacing of the tobacco leaves and particularly the stemmed butts thereof as they are being carried to and through the stemming unit. To this end it is an object of the invention to maintain and augment the spacing naturally produced in the butts of the leaves as they are threshed or flailed in the threshing mechanism, it having been found that there is a better separation at this point than is produced by many of the devices intended for this purpose. Still another object is to substitute for easily worn and breakable belts hitherto employed for this purpose, steel chains which are more immune to wear and more uniform in action. Another object of the invention is to utilize chain structure for producing a better grip on the stem and for maintaining more securely the spacing of the stems at the receiving end of the leaf feed chains.

Another object of the invention is to provide for inclining the stems relative to grippers to which they are transferred for the purpose of obtaining an optimum position of the stems which are ordinarily pulled diagonally through the stemming unit, particularly a position which will reduce stem breakage and the number of drop leaves. With these and other objects not specifically mentioned in view, the invention consists in certain constructions and combinations which will be hereinafter fully described and then particularly pointed out in the claims hereunto appended.

Referring now to the drawings in which like characters of reference indicate the same or like parts:

Fig. 1 is a side elevation of the improved leaf feed;

Fig. 2 is a plan view of the mechanism shown in Fig. 1;

Fig. 3 is a detail side elevation of parts shown in Fig. 1;

Fig. 4 is a detail sectional view on the line 4—4 of Fig. 1;

Fig. 5 is a detail view in front elevation looking toward the stemming machine from the receiving end of the feed chains;

Fig. 5A is a detail of the feed chains shown in Fig. 1;

Figs. 6, 7 and 8 are detail sectional views on the lines 6—6, 7—7 and 8—8 respectively, showing positions of leaves at different points in the feed mechanism;

Figs. 9 and 10 are end elevations partly in section, seen from the left in Fig. 2 and showing the delivery end of the feed mechanism;

Fig. 11 is a side elevation of the parts shown in Figs. 9 and 10;

Fig. 12 is a detail side elevation of the chain supporting and guiding mechanism;

Fig. 13 is a sectional detail view in end elevation of parts shown in Fig. 12;

Fig. 14 is a detail end elevation of parts shown in Fig. 12;

Fig. 15 is a plan view of the parts shown in Fig. 12;

Fig. 16 is a detail elevation of parts shown in Fig. 15;

Fig. 17 is a detail view in end elevation of the mechanism shown in Fig. 16.

In the embodiments herein illustrated, there is provided in a leaf feed for stemming machines, a pair of chains having opposed stretches for gripping and forwarding leaves by their stems together with means for driving and guiding said chains. Said means include mechanism to warp said stretches along their length to receive the stems in one plane and to deliver stems in a plane at an angle to the first mentioned plane. Preferably said means include sets of sprockets over which said chain stretches run and in the best forms the sprockets of one stretch are opposed the spaces between the sprockets of the other stretch. In the best forms, threshing means for stem butts are provided together with means for engaging said butts when separated by the threshing action for delivering the separated leaves into the grip of said chains. The various means referred to may be varied widely in construction within the scope of the claims, for the particular device selected to illustrate the invention is but one of many possible concrete embodiments of the same. The invention therefore is not to be restricted to the precise details shown and described nor to the particular embodiments chosen as illustrative of the invention.

Referring to Figs. 1 and 2 of the drawings, the tobacco leaves L after being spread on a feed belt A by the operator, are passed along between the feed belt A and the thresher belt B through the thresher unit C where the butt ends of the leaves are stripped of the leaf part for a short distance, sufficient to provide a portion for gripping by the grippers D on the leaf carrier chain E.

As shown in Figs. 3 and 4, as the leaves pass by the thresher unit they are acted upon by the thresher flails 10 which rotate rapidly in a direction to carry the flails toward the end of the leaf butt. It has been found toward the end of the thresher operation, the stems, due to the action of the flails, are well separated so that there are very few bunches of two or more stem butts in a group and this discovery has been taken advantage of by providing spacer star wheels 11 and 12 for maintaining and if desired, augmenting the spacing at the end of the thresher. These star wheels (Fig. 15) have their points opposed and overlapping so that the stems are locked apart in separate notches as they pass through the star wheels into the bight of the feed chains 13 and 14.

As shown in Fig. 1, the feed chains receive the stems in substantially horizontal position between two opposed chain stretches which securely grip the leaves between the links thereof and owing to the fact that the chains are warped or twisted about their length, approximately ninety degrees, these chains at their delivery end, deliver the stems in substantial vertical position with the butts thereof within the range of the action of the grippers D, on the endless gripper chain E, the construction and operation of which are fully set forth in the co-pending application above referred to. For the purpose of guiding and supporting these chain stretches as they carry the leaves, warped bars 16 and 17 are provided having secured thereto a series of sprockets 15 over which said chain stretches run.

It will be noted that the sprockets acting on the chain stretch on one side of the stems oppose the spaces between sprockets acting on the other side of the stems. Thus a large stem will cause the chain to yield and follow a slightly sinuous path without crushing or possibly breaking of the stems as might occur if the sprockets were directly opposed. This arrangement of the sprockets provides for better gripping of small stems when near a large stem. The chains 13 and 14 are conventionally roller chains having link or side plates 13a connected by pins 13b. These links have raised edges adjacent the pins and depressed edges intermediate the pins thus presenting a corrugated surface for engagement with the stems which serves to more securely maintain the spacing of stems along the chain stretches. It will be noted that the chains 13 and 14 are arranged (Fig. 2) so that the raised portion of the chain links of one stretch oppose the depressed portions of the other stretch so that although the space between chains is somewhat sinuous in outline, the distance between the chain stretches at different points remains substantially the same.

As shown in Fig. 5 the operating chain stretches of the chains 13 and 14 are opposed laterally so that the side plates of one stretch oppose the pins or roller intermediate the side plates of the other stretch thus tending to push a portion of the leaf between the said side links and to give the stem a corrugated conformation. This provides a much more secure grip on the stem than would result from opposed smooth or rounded surfaces and is one factor in reducing the number of drop leaves.

At the delivery end of the chains 13 and 14, the grippers D travel astride the vertical upstanding leaf butts traveling in the same direction at substantially the same speed and before the latter are released from the chains close on the butts as shown in Fig. 10 by the operation of means disclosed in the application above referred to.

A warped guide plate 18 having a twist similar to that of the conveyor chains assists in steering the stem L from horizontal to vertical position into the space between the open grippers D.

In machines of this type, the leaves are often carried by grippers such as grippers D through the stemming unit S on a diagonal path so that for optimum gripping effect and elimination of breakage due to the sharp angle of the stem at the gripper edge, it is desirable to incline the stem butt as it is received by the grippers. For this purpose, a disk 19 with a serrated edge and a peripheral speed a little greater than the speed at which the leaf L is traveling within the chains 13 and 14, is provided which causes the stem to assume the inclination referred to.

In order to accommodate leaves of stems of varying thicknesses, the guide bars 16 and 17 are pivotally connected at one end, one at one end and the other at the other end and are spring pressed towards each other at the opposite ends as shown in Figs. 12 to 17 inclusive. These surfaces also serve to provide the gripping pressure desired on the stems. For this purpose the guide bar 16 is pivoted at 31 and its opposite end is connected to lever 32 which is pivoted at 33 and forced toward the other bar 17 by the spring 34 acting on said lever. Similarly the guide bar 17 is pivoted at 35 and its opposite end is connected to lever 36 which is pivoted at 37 and urged towards lever 32 by a spring 38. Thus as the stems enter between the chains 13 and 14 the upper guide bars 16 on which chain 13 is mounted rises sufficiently to accommodate the stem and it is gripped between the lower and upper chains under pressure provided by the spring 34. As the stem approaches the end of the guide bar 17 carrying chain 14, it is acted upon by this chain under a pressure produced by the spring 38 so that the stem is at all times gripped under spring pressure.

What is claimed is:

1. In a tobacco leaf feed, the combination with a pair of endless travelling chains having opposed stretches, and means for supporting and guiding said stretches to grip the stems of the leaves between them and forward said leaves, said means including mechanism for warping said stretches about their length to receive the stems in one plane and to deliver said stems in a plane at an angle to the first mentioned plane.

2. In a tobacco leaf feed, the combination with a pair of endless travelling chains having opposed stretches, means for supporting and guiding said stretches to grip directly the stems of the leaves between them and forward said leaves, said means including sets of sprockets over which said chain stretches run, and mechanism acting on said sprockets to resiliently urge one of said stretches towards the other.

3. In a tobacco leaf feed, the combination with a pair of chains having opposed stretches for gripping and forwarding tobacco leaves by their stems, of means for spacing said stems and feeding the spaced stems into the grip of said chains, said means including a pair of rotating star wheels arranged point to point.

4. In a tobacco leaf feed, the combination with mechanism for threshing the leaf butts, of devices providing continuous opposed gripping surfaces for forwarding the leaves by their stems, and means engaging the stem butts when separated by the threshing action of said mechanism and delivering the separated leaves into the grip of said devices, said means including a star wheel.

5. In a leaf feed for tobacco stemming machines, the combination with a pair of endless members having opposed stretches for gripping and forwarding the leaves by their stems, of an endless set of grippers travelling along said members for receiving the stems therefrom, and means for inclining the projecting portions of said stems relative to said grippers to cause the same to be gripped at an incline to the direction of movement of the grippers.

6. In a leaf feed for tobacco stemming machines, the combination with a pair of endless members having opposed stretches for gripping and forwarding the leaves by their stems, of an endless set of grippers travelling along said members for receiving the stems therefrom, and means for inclining the projecting portions of said stems relative to said grippers to cause the same to be gripped at an incline to the direction of movement of the grippers, said means including mechanism having a stem engaging surface travelling in the same direction but at a greater speed than said chains.

7. In a leaf feed for tobacco stemming machines, the combination with a pair of endless members having opposed stretches for gripping and forwarding the leaves by their stems, of an endless set of grippers travelling along said members for receiving the stems therefrom, and means for inclining the projecting portions of said stems relative to said grippers to cause the same to be gripped at an incline to the direction of movement of the grippers, and comprising a wheel having a serrated periphery.

8. The combination with a tobacco stemming unit, of an endless series of grippers for carrying leaves into the range of action of said unit, and means for feeding the tobacco leaves by their stems into said unit comprising a pair of travelling endless chains having opposed stretches between which said stems are gripped, means for separating the stems of the leaves and feeding the separated stems between said chain stretches, and mechanism for warping said chain stretches about their length to deliver the stems in a different plane from that in which they were received from the separating means.

RUPERT E. RUNDELL.